(12) United States Patent
Lambert

(10) Patent No.: US 9,027,682 B2
(45) Date of Patent: May 12, 2015

(54) SELF CHARGING ELECTRIC VEHICLE

(71) Applicant: Daniel James Lambert, Huburtus, WI (US)

(72) Inventor: Daniel James Lambert, Huburtus, WI (US)

(*) Notice: Subject to any disclaimer, the term of this patent is extended or adjusted under 35 U.S.C. 154(b) by 0 days.

(21) Appl. No.: 14/025,976

(22) Filed: Sep. 13, 2013

(65) Prior Publication Data

US 2014/0216831 A1    Aug. 7, 2014

Related U.S. Application Data

(60) Provisional application No. 61/759,662, filed on Feb. 1, 2013.

(51) Int. Cl.
| | |
|---|---|
| *B60K 1/02* | (2006.01) |
| *B60W 20/00* | (2006.01) |
| *B60W 10/08* | (2006.01) |
| *B60W 10/26* | (2006.01) |
| *B60W 10/30* | (2006.01) |
| *B60W 30/18* | (2012.01) |

(52) U.S. Cl.
CPC ....... *B60W 20/106* (2013.01); *B60W 30/18127* (2013.01); *B60W 10/08* (2013.01); *B60W 10/26* (2013.01); *B60W 10/30* (2013.01); *B60W 2540/10* (2013.01); *B60W 2540/12* (2013.01); *B60W 2550/142* (2013.01)

(58) Field of Classification Search
CPC .................... B60K 7/0007; B60K 2007/0038; B60K 2007/0092
USPC ....................... 180/65.51, 65.31, 65.8, 65.275
See application file for complete search history.

(56) References Cited

U.S. PATENT DOCUMENTS

| | | | | |
|---|---|---|---|---|
| 4,133,403 | A * | 1/1979 | Priddy et al. ............... | 180/65.22 |
| 4,570,741 | A * | 2/1986 | McCoy ........................ | 180/242 |
| 4,951,769 | A * | 8/1990 | Kawamura ............... | 180/65.245 |
| 5,148,883 | A * | 9/1992 | Tanaka et al. ............... | 180/165 |
| 5,222,568 | A * | 6/1993 | Higasa et al. ............... | 180/65.51 |
| 5,224,563 | A * | 7/1993 | Iizuka et al. ............... | 180/65.21 |
| 5,465,806 | A * | 11/1995 | Higasa et al. ............... | 180/165 |
| 5,680,908 | A * | 10/1997 | Reed ........................ | 180/65.245 |
| 5,686,818 | A * | 11/1997 | Scaduto ........................ | 180/65.1 |
| 5,810,106 | A * | 9/1998 | McCoy ........................ | 180/243 |
| 5,921,338 | A * | 7/1999 | Edmondson ............... | 180/65.51 |
| 6,880,654 | B2 * | 4/2005 | Plishner ........................ | 180/65.6 |
| 6,892,846 | B2 * | 5/2005 | Mellot et al. ............... | 180/243 |
| 6,909,959 | B2 * | 6/2005 | Hallowell ........................ | 701/88 |
| 6,964,311 | B2 * | 11/2005 | Yang ........................ | 180/65.1 |
| 7,111,704 | B2 * | 9/2006 | Johnson ........................ | 180/307 |
| 7,255,185 | B2 * | 8/2007 | Shimizu ........................ | 180/65.1 |
| 7,958,960 | B2 * | 6/2011 | Mizutani et al. ............ | 180/65.51 |
| 8,255,104 | B2 * | 8/2012 | Terayama ........................ | 701/22 |
| 8,360,185 | B2 * | 1/2013 | Ogata ........................ | 180/65.51 |
| 2008/0011531 | A1 * | 1/2008 | Cole ........................ | 180/65.5 |

(Continued)

*Primary Examiner* — Jeffrey J Restifo

(57) ABSTRACT

A self charging electric vehicle includes a frame, at least one battery, a distribution box, an engine control unit, a plurality of drive axle systems, and a plurality of electric modules. The plurality of drive axle systems is positioned on the frame and a motor of each of the drive axle system is powered by the battery. A drive axle generator of each of the drive axle system re-charges the battery through the distribution box as the drive axle generator is selectively engaged with the motor by a clutch. The clutch is automatically operated by the engine control unit as the plurality of electric modules provides data back into the engine control unit so that the drive axle generator can be efficiently engaged with rotational motion of the motor.

7 Claims, 10 Drawing Sheets

(56) References Cited

U.S. PATENT DOCUMENTS

| | | | |
|---|---|---|---|
| 2009/0093931 A1* | 4/2009 | Mizutani et al. | 701/42 |
| 2010/0108417 A1* | 5/2010 | Gilmore | 180/65.51 |
| 2013/0035817 A1* | 2/2013 | Bahar et al. | 701/22 |
| 2013/0320747 A1* | 12/2013 | Ozaki | 301/6.5 |
| 2013/0325239 A1* | 12/2013 | Ozaki | 701/22 |
| 2013/0342150 A1* | 12/2013 | Ozaki | 318/490 |
| 2013/0345918 A1* | 12/2013 | Ozaki | 701/22 |
| 2014/0285128 A1* | 9/2014 | Ozaki | 318/400.13 |
| 2014/0324265 A1* | 10/2014 | Ozaki | 701/22 |
| 2014/0330471 A1* | 11/2014 | Ozaki | 701/22 |
| 2014/0336856 A1* | 11/2014 | Loos et al. | 701/22 |

* cited by examiner

SELF CHARGING ELECTRIC VEHICLE

The current application claims a priority to the U.S. Provisional Patent application Ser. No. 61/759,662 filed on Feb. 1, 2013.

FIELD OF THE INVENTION

The present invention relates generally to an apparatus for a vehicle. More specifically, the present invention is an apparatus for a self charging electric vehicle.

BACKGROUND OF THE INVENTION

One of the most popular modes of transportation is by utilizing vehicles, where most the vehicles are powered by gasoline engines. Because of the rising fuel cost and environmental pollution of the gasoline use, many automakers are looking into alternative fuel vehicles such as electric vehicles. Even though the electric vehicles date back to mid-19$^{th}$ century, the electric vehicles have been unpopular means of transportation due to their high cost, low top speed, and short range compared to the gasoline powered vehicles. Due to the improvements of the modern technology, the electric vehicles are making a comeback into the auto industry wherein different electric automakers introduce different driving systems. Many of the electric automakers seek to improve upon the most common downsides of the electric vehicles so that they can reduce the cost of electric vehicles, improve the top speed, and improve the range of distance per charge.

It is therefore an object of the present invention to introduce an apparatus for a self charging electric vehicle that improves the range of distance per charge while maintaining a sufficient top speed and comparative cost compare to other electric vehicles. The present invention is able harness the free motion of the wheels through clutched generators in such way that the battery of the present invention is continuously charged so that the range of distance per charge can be drastically improved. The engine control unit of the present invention automatically controls the drive system of the present invention in order to obtain the optimal efficiency.

DETAIL DESCRIPTIONS OF THE INVENTION

All illustrations of the drawings are for the purpose of describing selected versions of the present invention and are not intended to limit the scope of the present invention.

Figure 1:
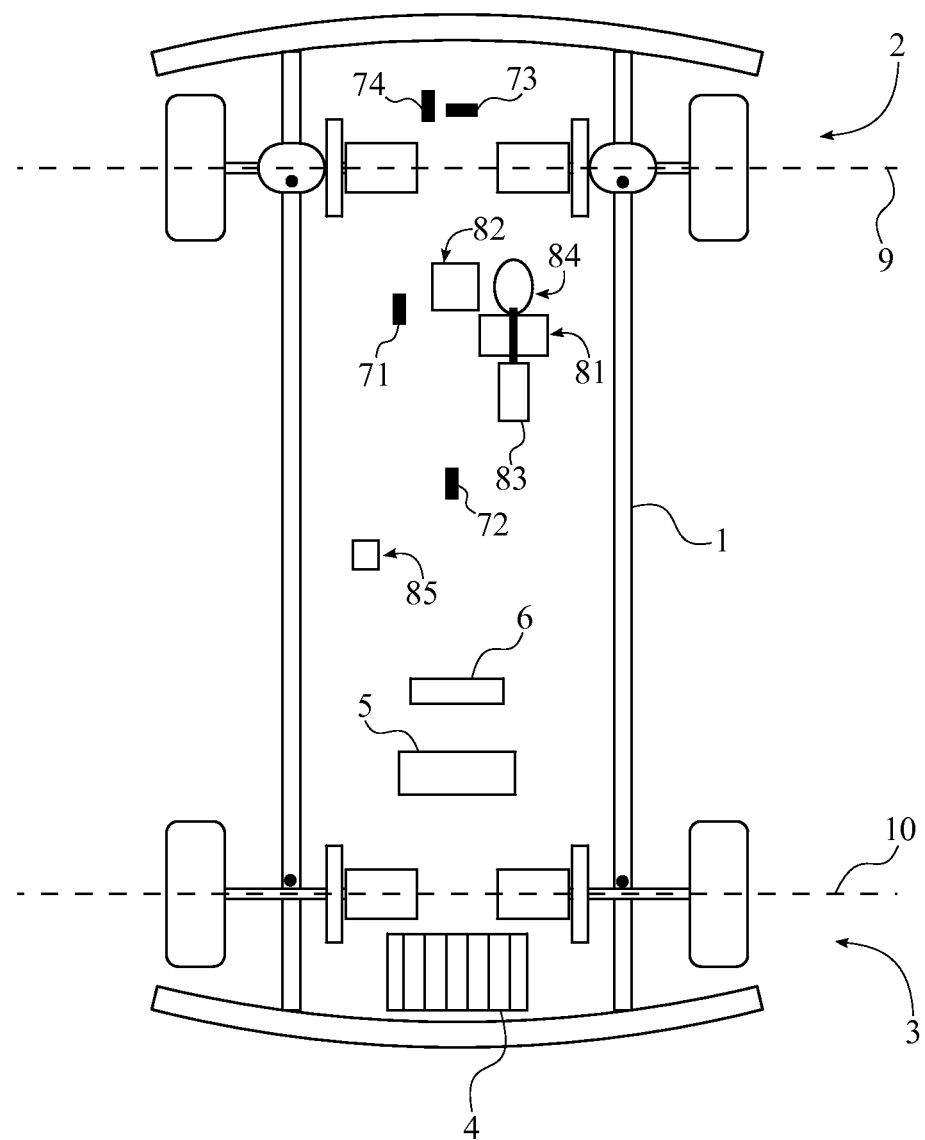
FIG. 1 is a basic illustration showing the components of the first configuration of the present invention.
Figure 3:
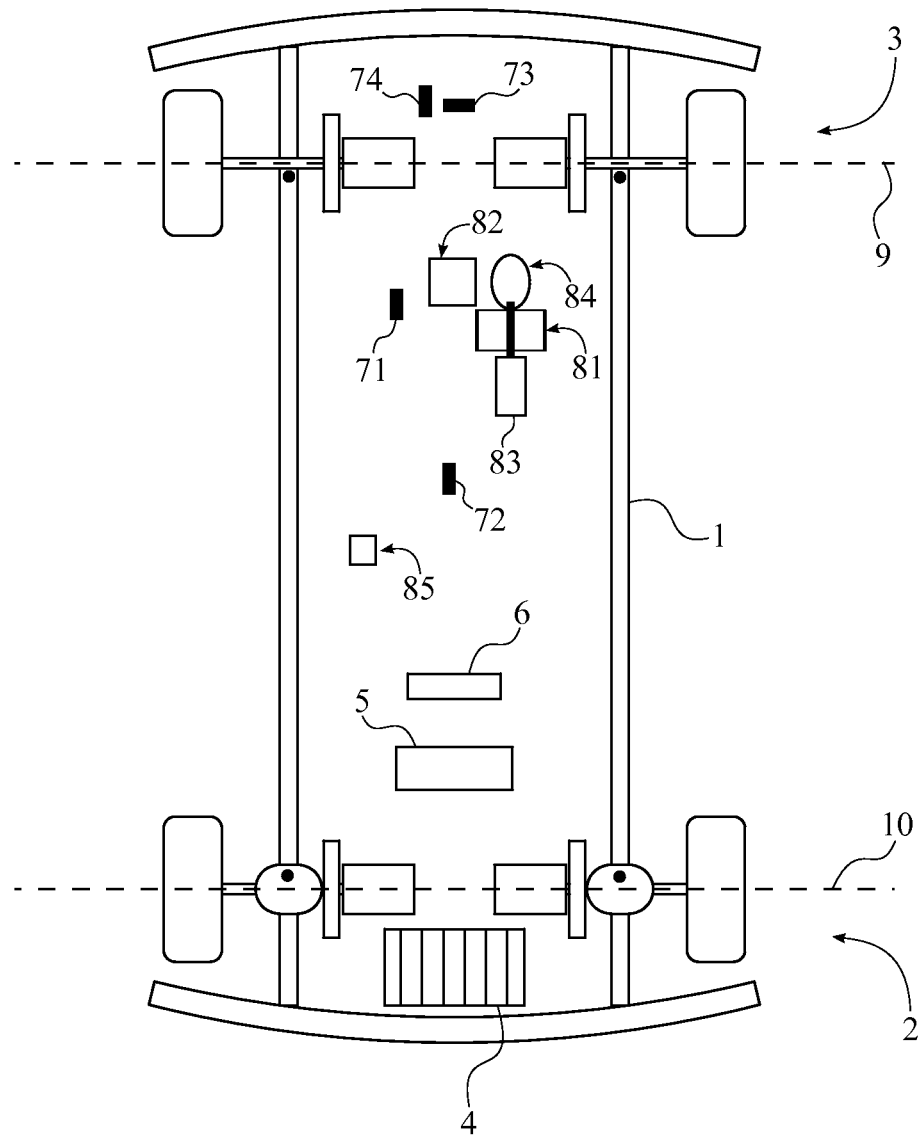
FIG. 3 is a basic illustration showing the components of the second configuration of the present invention.

The present invention is an apparatus for a self charging electric vehicle that harnesses the free rotational motion of the wheels to generate power. The drive system and all of the secondary systems of the present invention are completely powered from the electric current while the consumption of gasoline is completely eliminated. In reference to FIG. 1, FIG. 3, and FIG. 5, the present invention comprises a frame 1, a plurality of drive axle systems 2, a plurality of dead axle systems 3, at least one battery 4, a distribution box 5, an engine control unit (ECU) 6, a plurality of electric modules 7, and a plurality of ancillary vehicle systems 8. The present invention is described with three different configurations hereinafter in order to explain a front wheel drive electric vehicle, a rear wheel drive electric vehicle, and all wheel drive electric vehicle, where the front and rear wheel drive electric vehicles utilize the plurality of dead axle systems 3, and the all wheel drive electric vehicle does not utilize the plurality of dead axle systems 3.

Figure 2:
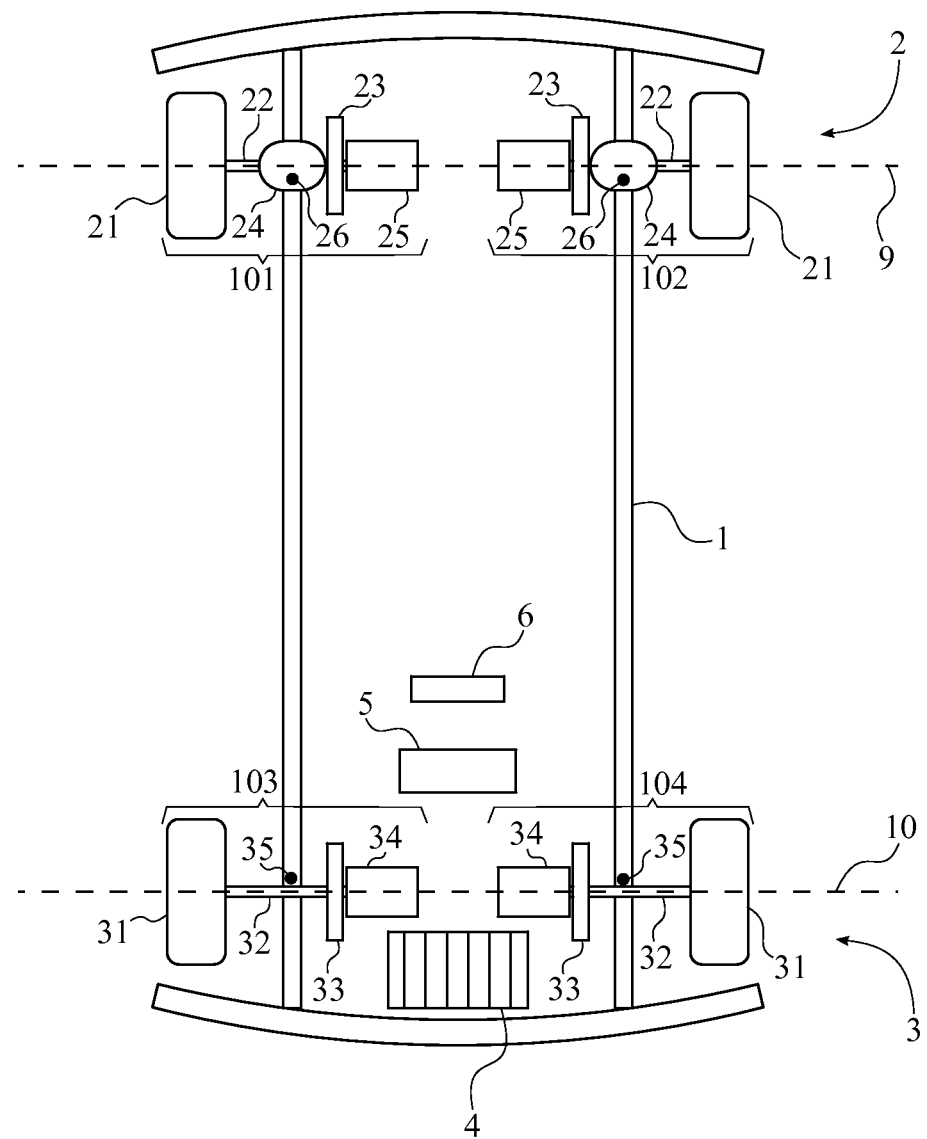
FIG. 2 is another basic illustration showing additional the components of the first configuration of the present invention.
Figure 4:
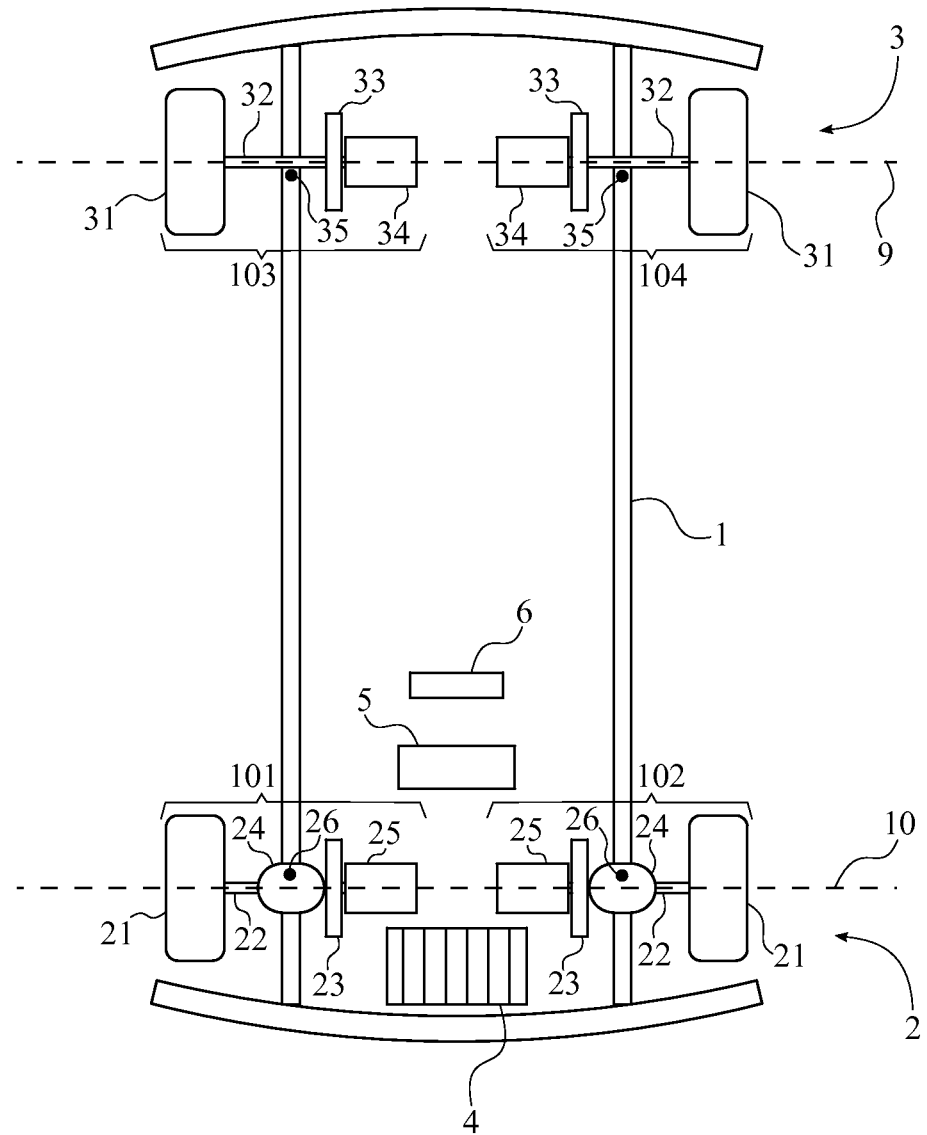
FIG. 4 is another basic illustration showing additional the components of the second configuration of the present invention.

In reference to FIG. 2 and FIG. 4, the plurality of drive axle systems 2 comprises a left drive wheel system 101 and a right drive wheel system 102, and the plurality of dead axle systems 3 comprises a left dead wheel system 103 and a right dead wheel system 104. The left drive wheel system 101, the right drive wheel system 102, the left dead wheel system 103, and the right dead wheel system 104 are connected on the frame 1 in such way that the left drive wheel system 101 and the right drive wheel system 102 are oppositely positioned from the left dead wheel system 103 and the right dead wheel system 104. As for the first configuration of the present invention which describes the front wheel drive electric vehicle, the left drive wheel system 101 and the right drive wheel system 102 are oppositely positioned from each other along a front wheel rotational axis 9, and the left dead wheel system 103 and the right dead wheel system 104 are oppositely positioned from each other along a rear wheel rotational axis 10. As for the second configuration of the present invention which describes the rear wheel drive electric vehicle, the left drive wheel system 101 and the right drive wheel system 102 are oppositely positioned from each other along the rear wheel rotational axis 10, and the left dead wheel system 103 and the right dead wheel system 104 are oppositely positioned from each other along the front wheel rotational axis 9.

As shown in FIG. 2 and FIG. 4, each of the plurality of drive axle systems 2 of the first and second configurations, which is the left drive wheel system 101 and the right drive wheel system 102, comprises a drive wheel 21, a drive shaft 22, a motor clutch 23, a motor 24, a motor position sensor 26, and a drive axle generator 25. The drive wheel 21, which provides the final driving force for the first and second configurations, is torsionally coupled with the motor 24 by the drive shaft 22. The motor 24 provides the necessary rotational force so that the drive wheel 21 can be rotated around either the rear wheel rotational axis 10 or the front wheel rotational axis 9. As for the first configuration, the drive shaft 22 is a constant velocity (CV) shaft that comprises an outer CV joint and an inner CV joint. More specifically, the outer CV joint is coupled with the drive wheel 21, and the inner CV joint is coupled with a motor shaft of the motor 24 so that the drive wheel 21 can be rotated with respect to the front wheel rotational axis 9. The CV shafts and the drive wheels 21 of the left drive wheel system 101 and the right drive wheel system 102 enable the steering system of the first configuration to steer left or right. As for the second configuration, the drive shaft 22 is a straight axle that comprises an outer end and an inner end. More specifically, the outer end is coupled with the drive wheel 21, and the inner end is coupled with the motor shaft of the motor 24 so that the drive wheel 21 can be rotated with respect to the rear wheel rotational axis 10. The motor shaft is traversed through a motor housing of the motor 24 in such way that the motor shaft is protruded from a front end and a back end of the motor 24. A rotor shaft of the drive axle generator 25 is selectively and torsionally engaged with the motor 24 by the motor clutch 23. More specifically, the motor shaft selectively and torsionally engages with the rotor shaft by the motor clutch 23, where the motor clutch 23 is positioned in between the motor 24 and the drive axle generator 25 and concentrically connected around the motor shaft. The motor clutch 23 of the first and second configurations can be a mechanical clutch, a fluid clutch, or an electric clutch. When the drive axle generator 25 is engaged with the motor shaft through the motor clutch 23, the rotational force of the motor shaft turns the rotor shaft which then produces electricity. The ECU 6 of the first and second configurations determines when the motor clutch 23 should engage or disengage with the motor shaft in order to maximize the efficiency of the first and second configurations. The motor position sensor 26 is positioned within the motor housing, where the motor position sensor 26 detects the speed and the position of the motor shaft.

As shown in FIG. 2 and FIG. 4, each of the plurality of dead axle systems 3 of the first and second configurations, which is the left dead wheel system 103 and the right dead wheel system 104, comprises a free-rotating wheel 31, an axle shaft 32, an axle clutch 33, a wheel position sensor 35, and a dead axle generator 34. The free-rotating wheel 31 is torsionally coupled with the axle shaft 32, where the axle shaft 32 is a straight axle for the first configuration and a CV shaft for the second configuration. The CV shafts and the free-rotating wheels 31 of the left dead wheel system 103 and the right dead wheel system 104 enable the steering system of the second configuration to steer left or right. A rotor shaft of the dead axle generator 34 selectively and torsionally engages with the axle shaft 32 by the axle clutch 33, where the axle clutch 33 is positioned in between the free-rotating wheel 31 and the dead axle generator 34, and the axle clutch 33 is concentrically connected around the axle shaft 32. The axle clutch 33 of the first and second configurations can be a mechanical clutch, a fluid clutch, or an electric clutch. When the dead axle generator 34 is engaged with the axle shaft 32 through the axle clutch 33, the rotational force of the axle shaft 32 turns the rotor shaft which then produces electricity. The ECU 6 of the first and second configurations determines when the axle clutch 33 should engage or disengage with the axle shaft 32 in order to maximize the efficiency of the first and second configurations. The wheel position sensor 35 is adjacently positioned with the axle shaft 32, where the wheel position sensor 35 detects the speed and the position of the axle shaft 32.

Figure 5:
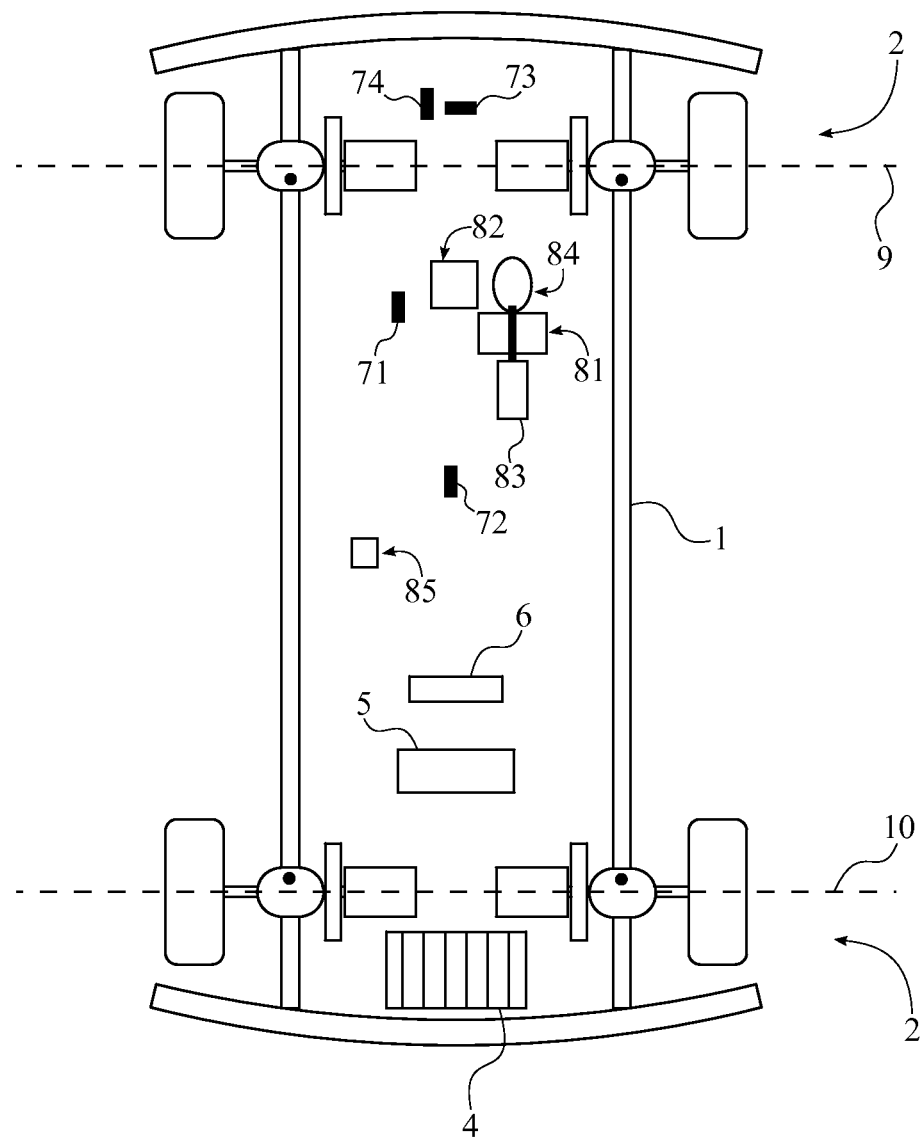
FIG. 5 is a basic illustration showing the components of the third configuration of the present invention.
Figure 6:
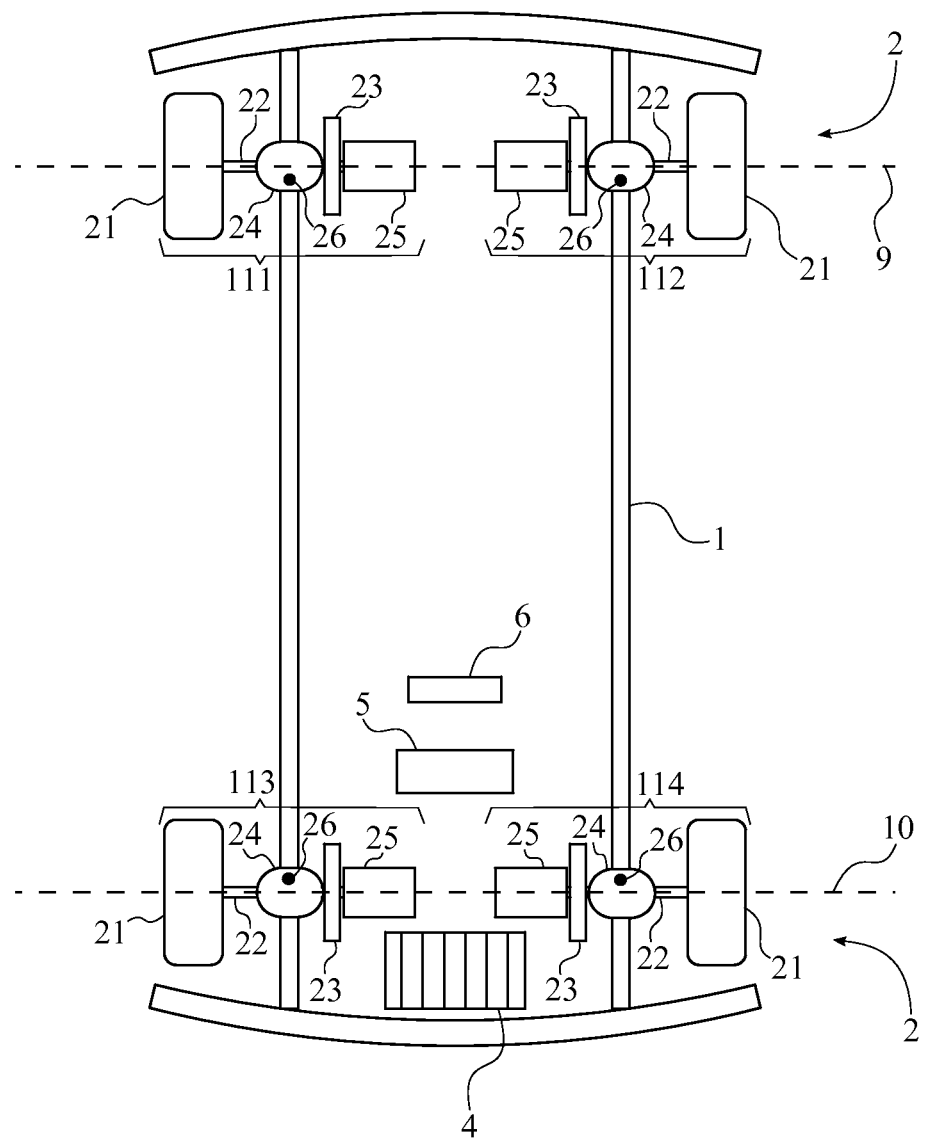
FIG. 6 is another basic illustration showing additional the components of the third configuration of the present invention.

In reference to FIG. 5 and FIG. 6, the third configuration of the present invention is the all wheel drive electric vehicle, where the plurality of drive axle systems 2 comprises a left front drive wheel system 111, a right front drive wheel system 112, a left rear drive wheel system 113, and a right rear drive wheel system 114. The left front drive wheel system 111, the right front drive wheel system 112, the left rear drive wheel system 113, and the right rear drive wheel system 114 are connected on the frame 1 in such way that the left front drive wheel system 111 and the right front drive wheel system 112 are oppositely positioned from the left rear drive wheel system 113 and the right rear drive wheel system 114. More specifically, the left front drive wheel system 111 and the right front drive wheel system 112 are oppositely positioned from each other along the front wheel rotational axis 9, and the left rear drive wheel system 113 and the right rear drive wheel system 114 are oppositely positioned from each other along the rear wheel rotational axis 10.

As shown in FIG. 6, each of the plurality of drive axle systems 2 of the third configuration, which is the left front drive wheel system 111, the right front drive wheel system 112, the left rear drive wheel system 113, and the right rear drive wheel system 114, comprises a drive wheel 21, a drive shaft 22, a motor clutch 23, a motor 24, a motor position sensor 26, and a drive axle generator 25. The drive wheel 21 that provides the final driving force is torsionally coupled with the motor 24 by the drive shaft 22, where the drive shaft 22 can be a straight axle that comprises an outer end and an inner end or a CV shaft that comprises an outer CV joint and an inner CV joint. As for the left rear drive wheel system 113 and the right rear drive wheel system 114, the outer end is torsionally coupled with the drive wheel 21, and the inner end is torsionally coupled with a motor shaft of the motor 24. As for the left front drive wheel system 111 and the right front drive wheel system 112, the outer CV joint is torsionally coupled with the drive wheel 21, and the inner CV joint is torsionally coupled with the motor shaft of the motor 24. The CV shafts and the drive wheels 21 of the left front drive wheel system 111 and the right front drive wheel system 112 allow the steering system of the third configuration to steer left or right. The motor shaft is traversed through a motor housing of the motor 24 in such way that the motor shaft is protruded from a front end and a back end of the motor 24. A rotor shaft of the drive axle generator 25 is selectively and torsionally engaged with the motor 24 by the motor clutch 23, where the motor clutch 23 is positioned in between the motor 24 and the drive axle generator 25, and the motor clutch 23 is concentrically connected around the motor shaft. Similar to the first and second configurations, the motor clutch 23 of the third configuration can be a mechanical clutch, a fluid clutch, or an electric clutch. The motor 24 provides the necessary rotational force so that the drive wheel 21 can be rotated around both the rear wheel rotational axis 10 and the front wheel rotational axis 9. When the drive axle generator 25 is engaged with the motor shaft through the motor clutch 23, the rotational force of the motor shaft turns the rotor shaft which then produces electricity. The ECU 6 of the third configuration determines when the motor clutch 23 should engage or disengage with the motor shaft in order to maximize the efficiency of the third configuration. The motor position sensor 26 is positioned within the motor housing, where the motor position sensor 26 detects the speed and the position of the motor shaft.

In order to maximize the output of the motors 24, direct current (DC) operated motors 24 are preferably used within the present invention. Even though the DC operated motors are used within the present invention, the present invention can also be operated with alternating current motors, and the drive axle generators 25 and the dead axle generators 34 have to be substituted with drive axle alternators and dead axle alternators so that alternating current can be generated.

In reference to FIG. 2, FIG. 4, FIG. 6, FIG. 9, and FIG. 10, the at least one battery 4, the distribution box 5, and the ECU 6 of the present invention are positioned on the frame 1. The at least one battery 4 of the present invention is preferably positioned on a rear end of the frame 1. The at least one battery 4 functions as the main power source of the present invention, where the battery has to charged through an external electrical outlet. The at least one battery 4 of the present invention is preferably lithium-ion batteries, but any other type of high energy density and low self-discharging batteries can also be used within the present invention. The distribution box 5 is adjacently positioned with the at least one battery 4 and electrically connected with the at least one battery 4.

The distribution box 5 distributes electricity from the at least one battery 4 and supplies electricity to the at least one battery 4 so that battery life of the at least one battery 4 can be improved within the present invention. Additionally, the motors 24, the drive axle generators 25, and the dead axle generators 34 of the first and second configurations are electrically connected with the distribution box 5. Therefore, the motors 24 can be powered through the distribution box 5 as the electricity is supplied from the at least one battery 4, and the at least one battery 4 can be recharged through the distribution box 5 as the drive axle generators 25 and the dead axle generators 34 supply electricity into the at least one battery 4. Similarly, the motors 24 and the drive axle generators 25 the third configuration are electrically connected with the distribution box 5; therefore, the motors 24 can be powered through the distribution box 5 as the electricity is supplied from the at least one battery 4, and the at least one battery 4 can be recharged through the distribution box 5 as the drive axle generators 25 supply electricity into the at least one battery 4. The ECU 6 is adjacently positioned with the distribution box 5 and electrically connected with the distribution box 5. The ECU 6 functions as the brain of the present invention, where the ECU 6 controls a series of function in order to ensure optimal performance of the present invention. The motor position sensors 26 of the first, second, and third configurations and the wheel position sensors 35 of the first and second configurations are electrically connected with the ECU 6 so that the motor position sensors 26 and the wheel position sensors 35 are able to communicate with the ECU 6. Similarly, the motor clutches 23 and the axle clutches 33 of the first and second configurations and the motor clutches 23 of the third configuration are electrically connected with the ECU 6 so that the motor clutches 23 and the axle clutches 33 can be controlled by the ECU 6.

Figure 8:
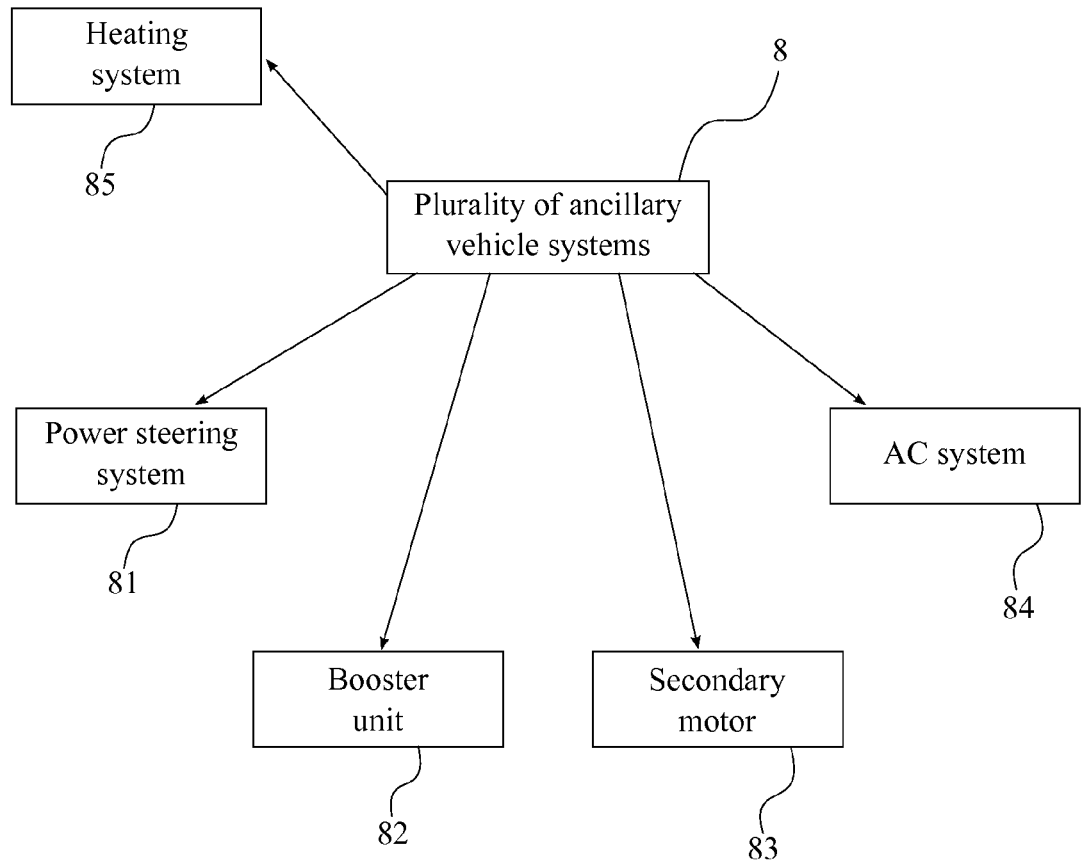
FIG. 8 is a view of the system for the plurality of ancillary vehicle systems.
Figure 9:
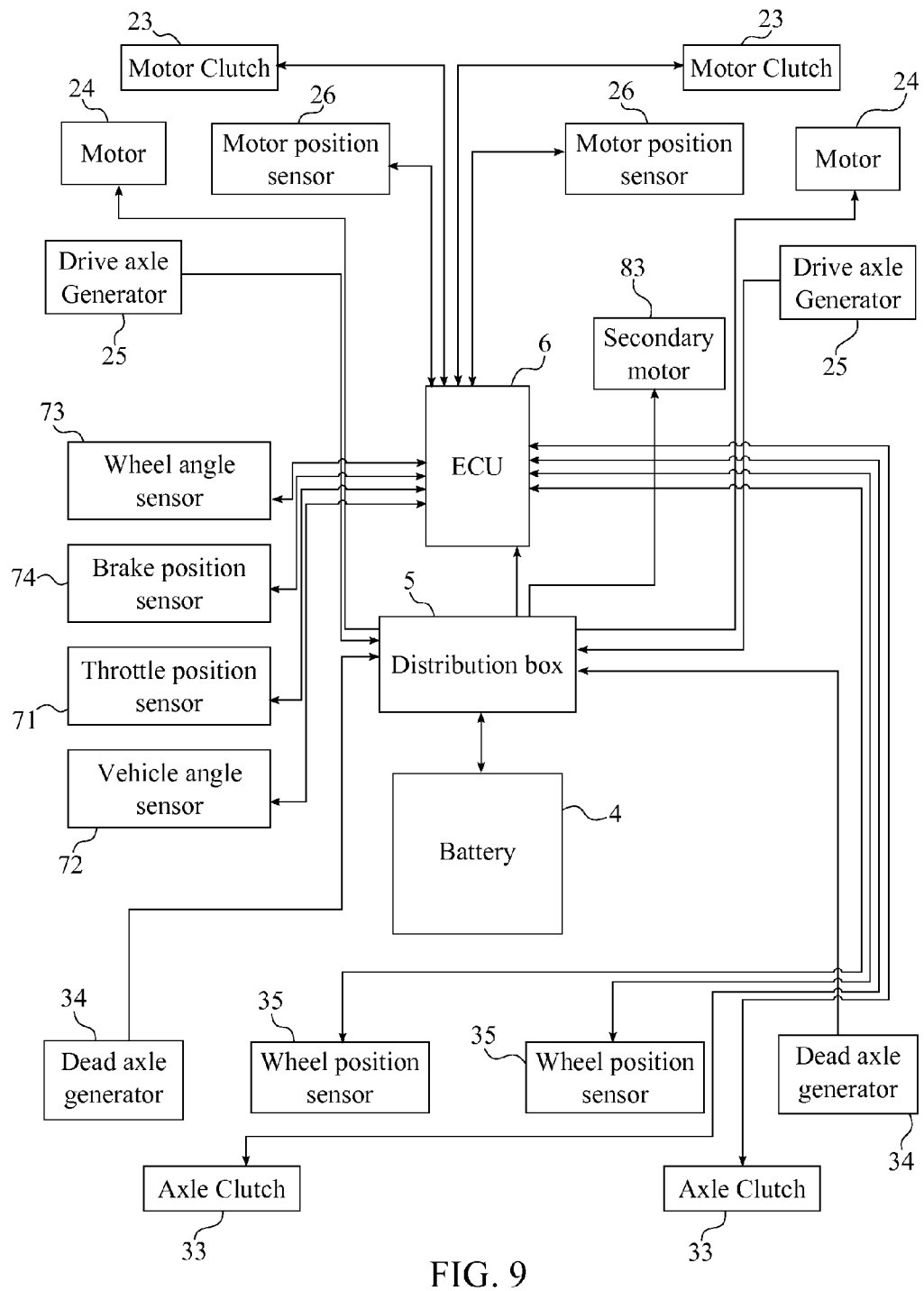
FIG. 9 is a basic illustration showing the electrical connections of the first and second configurations of the present invention.
Figure 10:
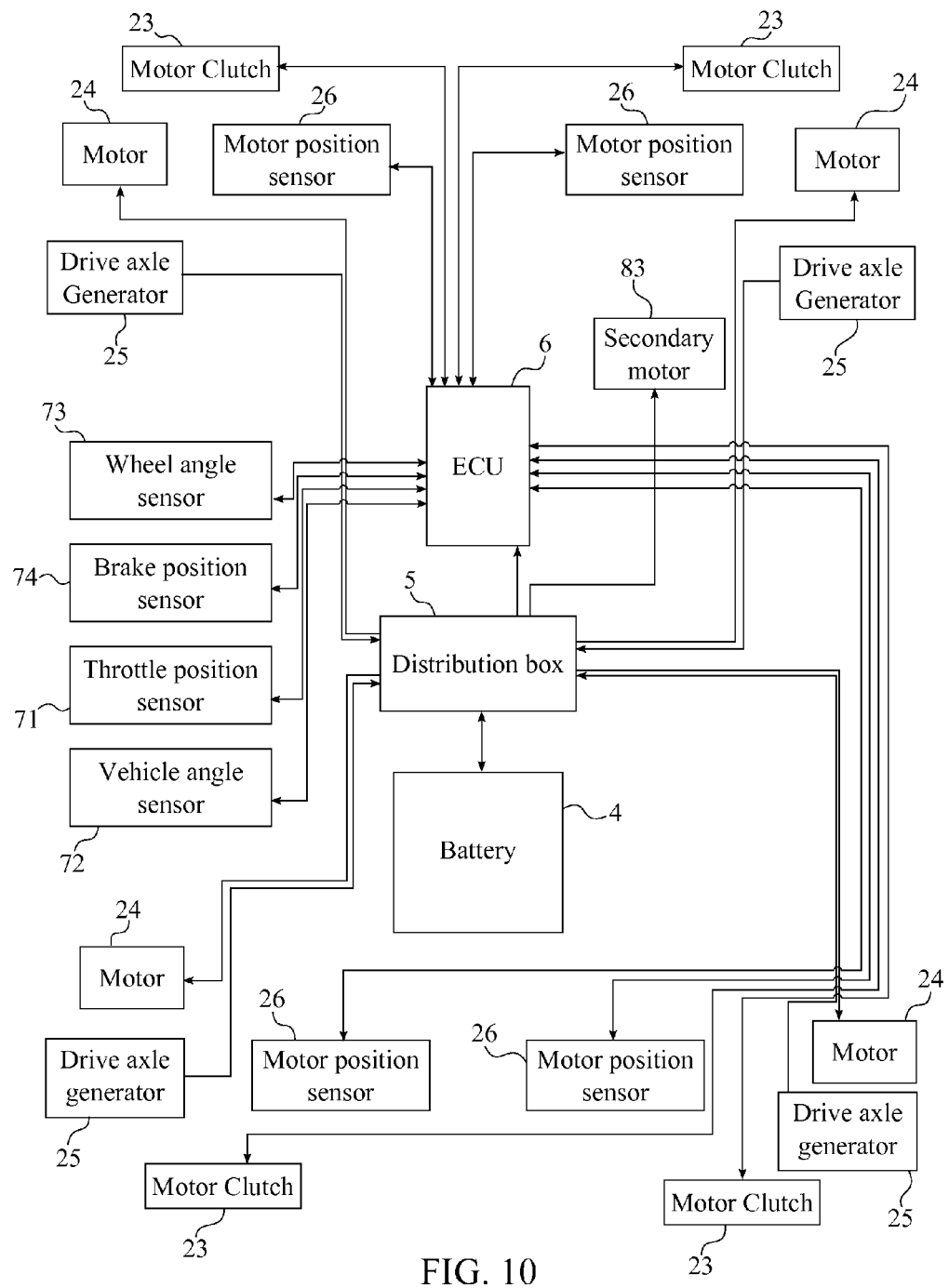
FIG. 10 is a basic illustration showing the electrical connections of the third configuration of the present invention.

In reference to FIG. 8, FIG. 9, and FIG. 10, the plurality of ancillary vehicle systems 8 of the present invention comprises a power steering system 81, a booster unit 82, a secondary motor 83, an air condition (AC) system 84, and a heating system 85. The power steering system 81 and the AC system 84 are operatively coupled by the secondary motor 83, where the secondary motor 83 is electrically connected with the distribution box 5. More specifically, the secondary motor 83 powers a power steering pump of the power steering system 81 and an AC compressor of the AC system 84. The booster unit 82 and the heating system 85 are in fluid communication with the power steering system 81 in such way that the fluid from the power steering system 81 is run through the booster unit 82 so that the booster unit 82 can assist the power braking and the power steering system 81 of the present invention when necessary. Additionally, the fluid from the power steering system 81 is run through a heat exchanger of the heating system 85 to provide heat to the vehicle cabin during colder climates. If requires, the heating system 85 also provides heat to the at least battery before a cold start of the present invention as the at least one battery 4 may require initial elevated temperature. The AC system 84, the power steering system 81, the booster unit 82, and the heating system 85 of the present invention function similar to the existing systems so that the users of the present invention are able to obtain a comfortable and safe driving experience.

Figure 7:
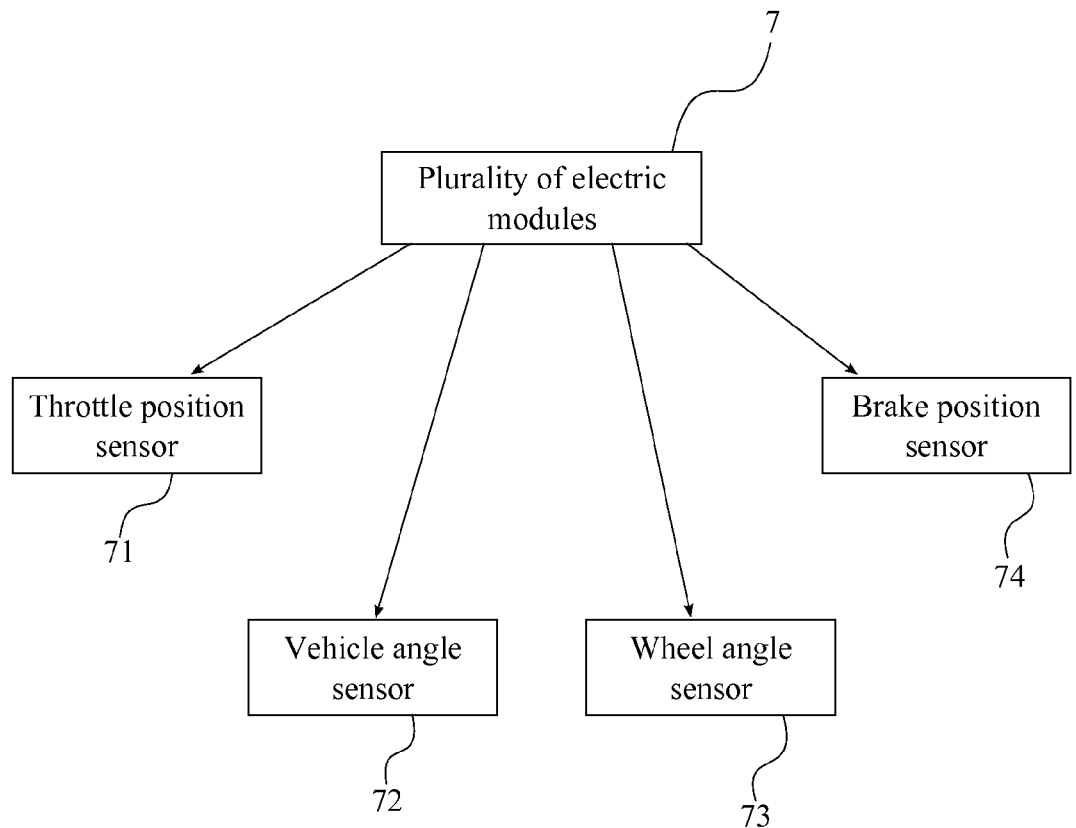
FIG. 7 is a view of the system for the plurality of electric modules.

In reference to FIG. 7, FIG. 9, and FIG. 10, the plurality of electric modules 7 of the present invention comprises a throttle position sensor 71, a vehicle angle sensor 72, a wheel angle sensor 73, and a brake position sensor 74. The throttle position sensor 71 is measurably connected with an accelerator pedal of the present invention, where the throttle position sensor 71 determines the speed of the motors 24. The present invention does not require a gearbox as the throttle position sensor 71 is able to control the speed of the motors 24 that determine the speed of the present invention. The throttle position sensor 71 is electrically connected with the ECU 6 in such way when the users of the present invention step on the accelerator pedal, the throttle position sensor 71 communicates with the ECU 6 so that the ECU 6 can determine the speed of the motors 24. The vehicle angle sensor 72 is measurably positioned on the frame 1, where the vehicle angle sensor 72 determines the angle of the present invention with respect to the front end and the rear end of the frame 1. The vehicle angle sensor 72 is electrically connected with the ECU 6 so that measured data can be relayed back to the ECU 6. For example, the vehicle angle sensor 72 is able to determine the angle of the present invention with respect to the driving surface when the present invention is moving along uphill or downhill surface. The wheel angle sensor 73 is measurably connected with the power steering system 81 so that the turning angle of the present invention can be measured. The wheel angle sensor 73 is electrically connected with the ECU 6, where the wheel angle sensor 73 relays the measured data back to the ECU 6. The brake position sensor 74 is measurably connected with a brake pedal of the braking system and electrically connected with the ECU 6. The present invention is equipped with traditional braking system, but the brake position sensor 74 detects the position of the brake pedal when brake pedal is pushed by the user. Then the ECU 6 is able to determine how much brake should be applied to the braking system, where the amount of brake applied to the braking system is determined by the position of the brake pedal.

When an ignition system of the present invention is switched into a starting position, the at least one battery 4 supplies the electrical power to the motors 24 as the distribution box 5 distributes the electric power. Similar to the traditional vehicles, the users of the present invention have to step on the accelerator pedal in order for the present invention to move from one location to another. Then the throttle position sensor 71 determines the position of the accelerator pedal, and position of the accelerator pedal is relayed back to the ECU 6. Then the ECU 6 determines how much power should be applied to the motors 24. Since the ECU 6 determines how much power is supplied to the motors 24 with respect to the position of the accelerator pedal, the users of the present invention are able to control the speed of the present invention without the gearbox. Once the present invention is moving, the motor position sensors 26 and the wheel position sensors 35 of the first and second configurations continuously calculate the speed and the position of the motor shafts and the axle shafts 32, and the motor position sensors 26 of the third configuration continuously calculate the speed and the position of the motor shafts. The calculated data from the motor position sensors 26 and the wheel position sensors 35 are continuously relayed back to the ECU 6 so that the ECU 6 can uniformly power the motors 24 without any irregularities.

As for the first and second configurations, if the ECU 6 determines that the speed from the motor position sensors 26 and the wheel position sensors 35 are higher than the required speed assigned by the throttle position sensor 71, the ECU 6 activates the drive axle generators 25 through the motor clutches 23 and/or the dead axle generators 34 through the axle clutches 33 so that the present invention can slow down into the required speed. Due to the activation of the drive axle generators 25 and/or the dead axle generators 34, the first and second configurations are able to put power back into the at least one battery 4. As for the third configuration, if the ECU 6 determines that the speed from the motor position sensors 26 are higher than the required speed assigned by the throttle position sensor 71, the ECU 6 activates the drive axle generators 25 through the motor clutches 23 so that the present invention can slow down into the required speed. Due to the activation of the drive axle generators 25, the third configuration of the present invention is able to put power back into the at least one battery 4.

When the present invention is travelling on downhill surface, the vehicle angle sensor 72 calculates the angle of the present invention which helps the ECU 6 to determine that the motors 24 do not have to power in order to achieve the required speed. As a result, the ECU 6 shuts down the power to the motors 24, resulting an energy saving stage for the at least one battery 4. When the present invention is taking left or right turn, the wheel angle sensor 73 determines the turning angle of the present invention. The turning angle of the present invention allows the ECU 6 to selectively slow down the motors 24 so that the present invention is able to safely make the turn. For example, when the first configuration or the second configuration of the present invention is making a left turn, the motor 24 in the left drive wheel system 101 rotates slower than the motor 24 in the right drive wheel system 102. This is accomplished by the ECU 6 during the left turn as the ECU 6 activates the drive axle generator 25 of the left drive wheel system 101 in order to slow down the motor 24 of the left drive wheel system 101 while putting power back in the at least one battery 4. Additionally, the ECU 6 can also activate the dead axle generator 34 of the left dead wheel system 103 in order to further slow down the first and second configurations. Similarly, when the first configuration or the second configuration of the present invention is making a right turn, the motor 24 in the right drive wheel system 102 rotates slower than the motor 24 in the left drive wheel system 101. This is also accomplished by the ECU 6 during the right turn as the ECU 6 activates the drive axle generator 25 of the right drive wheel system 102 in order to slow down the motor 24 of the right drive wheel system 102 while putting power back in the at least one battery 4. Additionally, the ECU 6 can also activate the dead axle generator 34 of the right dead wheel system 104 in order to further slow down the first and second configurations. As for the third configuration, the ECU 6 activates the drive axle generators 25 of the left front drive wheel system 111 and the left rear drive wheel system 113 during a left turn, or activates the drive axle generators 25 of the right front drive wheel system 112 and the right rear drive wheel system 114 during a right turn.

When the users of the present invention apply brake in order to slow down the present invention, the ECU 6 determines the amount of brake that needs to be applied to the drive wheels 21 and the free-rotating wheels 31 through the brake position sensor 74. If the ECU 6 determines that the present invention can be slow down by either the activation of the drive axle generators 25 and the dead axle generators 34 for the first and second configurations or the activation of drive axle generators 25 for the third configuration, the ECU 6 activates both the drive axle generators 25 and the dead axle generators 34 for the first and second configurations and activates only the drive axle generators 25 for the third configuration. This process allows the present invention to recharge the at least one battery 4 while slowing down the present invention. For example, when the users step on the brake pedal of the third configuration of the present invention, the brake position sensor 74 communicates with the ECU 6 so that the ECU 6 can determine that the entire drive axle generators 25 or some of the drive axle generators 25 have to be activated. If the present invention can't be slow down through the drive axle generators 25 or the dead axle generators 34, the traditional braking system is activated by the ECU 6 so that the present invention can either slow down or stop.

Although the invention has been explained in relation to its preferred embodiment, it is to be understood that many other possible modifications and variations can be made without departing from the spirit and scope of the invention as hereinafter claimed.

What is claimed is:

1. A self charging system for an electric powered vehicle comprises;
    a frame;
    a plurality of drive axle systems;
    at least one battery;
    a distribution box;
    an engine control unit (ECU);
    a plurality of electric modules;
    a plurality of ancillary vehicle systems;
    each of the plurality of drive axle systems comprises a drive wheel, a drive shaft, a motor clutch, a motor, a motor position sensor, and a drive axle generator;
    the plurality of electric modules comprises a throttle position sensor, a vehicle angle sensor, a wheel angle sensor, and a brake position sensor;
    the plurality of ancillary vehicle systems comprises a power steering system, a booster unit, a secondary motor, an air condition (AC) system, and a heating system;
    the power steering system and the AC system being operatively coupled by the secondary motor;
    the secondary motor being electrically connected with the distribution box; and
    the booster unit and the heating system being in fluid communication with the power steering system.

2. The self charging system for an electric powered vehicle as claimed in claim 1 comprises;
    the drive wheel being torsionally coupled with the motor by the drive shaft;
    the drive axle generator being selectively and torsionally engaged with the motor by the motor clutch;
    the motor clutch being positioned in between the motor and the drive axle generator; and
    the motor position sensor being positioned within the motor.

3. The self charging system for an electric powered vehicle as claimed in claim 1 comprises;
    the plurality of drive axle systems comprises a left front drive wheel system, a right front drive wheel system, a left rear drive wheel system, and a right rear drive wheel system;
    the left front drive wheel system, the right front drive wheel system, the left rear drive wheel system, and the right rear drive wheel system being connected on the frame; and
    the left front drive wheel system and the right front drive wheel system being oppositely positioned from the left rear drive wheel system and the right rear drive wheel system.

4. The self charging system for an electric powered vehicle as claimed in claim 3 comprises;
- the left front drive wheel system and the right front drive wheel system being oppositely positioned along a front wheel rotational axis;
- the left rear drive wheel system and the right rear drive wheel system being oppositely positioned along a rear wheel rotational axis;
- the motor of the left front drive wheel system, the right front drive wheel system, the left rear drive wheel system, and the right rear drive wheel system being electrically connected with the distribution box; and
- the drive axle generator of the left front drive wheel system, the right front drive wheel system, the left rear drive wheel system, and the right rear drive wheel system being electrically connected with the distribution box.

5. The self charging system for an electric powered vehicle as claimed in claim 1 comprises;
- the at least one battery, the distribution box, and the ECU being positioned on the frame;
- the at least one battery being electrically connected to with the distribution box;
- the ECU being electrically connected with the distribution box;
- the motor position sensors being electrically connected with the ECU; and
- the motor clutch being electrically connected with the ECU.

6. The self charging system for an electric powered vehicle as claimed in claim 1 comprises;
- the power steering system, the booster unit, the secondary motor, the AC system, and the heating system being positioned on the frame.

7. The self charging system for an electric powered vehicle as claimed in claim 1 comprises;
- the throttle position sensor being measurably connected with an accelerator pedal;
- the vehicle angle sensor being measurably positioned on the frame;
- the wheel angle sensor being measurably connected with the plurality of drive axle systems;
- the brake position sensor being measurably connected with a brake pedal; and
- the throttle position sensor, the vehicle angle sensor, the wheel angle sensor, and the brake position sensor being electrically connected with the ECU.

* * * * *